United States Patent [19]
Gray et al.

[11] Patent Number: 5,621,410
[45] Date of Patent: Apr. 15, 1997

[54] REMOTE PREDICTION OF LIGHTNING HAZARDS

[75] Inventors: Grant R. Gray; Paul R. Krehbiel, both of Socorro; Stephen E. Mc Crary, Datil; Marx Brook, Socorro; Tiehan Chen, Albuquerque; William Rison, Socorro, all of N.M.

[73] Assignee: New Mexico Tech Research Foundation, Socorro, N.M.

[21] Appl. No.: 972,114

[22] Filed: Nov. 5, 1992

[51] Int. Cl.$^6$ ..................................................... G01S 13/95
[52] U.S. Cl. ............................. 342/26; 342/188; 342/460
[58] Field of Search ........................... 342/26, 188, 460; 364/420

[56] References Cited

U.S. PATENT DOCUMENTS

| | | | |
|---|---|---|---|
| 3,508,259 | 4/1970 | Andrews | 343/6 |
| 3,611,365 | 10/1971 | Lundquist et al. | 340/421 |
| 4,023,408 | 5/1977 | Ryan et al. | 73/170 |
| 4,121,216 | 10/1978 | Bunch et al. | 343/113 |
| 4,213,131 | 7/1980 | Kaiser, Jr. | 343/844 |
| 4,395,906 | 8/1983 | Ryan et al. | 73/170 |
| 4,555,703 | 11/1985 | Cantrell | 343/5 SA |
| 4,672,305 | 6/1987 | Coleman | 324/72 |
| 4,684,951 | 8/1987 | Baumer | 342/460 |
| 4,768,034 | 8/1988 | Preikschat et al. | 342/80 |
| 4,806,851 | 2/1989 | Krider et al. | 324/72 |
| 4,841,304 | 6/1989 | Richard et al. | 342/460 |
| 5,140,523 | 8/1992 | Frankel et al. | 364/420 |

FOREIGN PATENT DOCUMENTS 1333546  10/1973  United Kingdom .

OTHER PUBLICATIONS

Bhattacharya, A.B., "Radar echoes for inter-stroke processes in lightening discharges", Indian J. Radio Space Phys., (India), vol. 21, No. 5, pp. 294–298, Oct. 1992.

Bhattacharya et al., "A comparison of linerly and circularly polarized waves in radar diagnostics of lightning", Indian J. Phys. B (India), vol. 61B, No. 5, pp. 456–459, Oct. 1987.

D.C. Cox et al., "Observations of Rapid Changes in the Orientation and Degree of Alignment of Ice Particles Along an Earth–Space Radio Propagation Path," *Journal of Geophysical Research,* vol. 84(C8), pp. 5003–5010 (1979).

A. Hendry et al., "Radar Observations of Polarization Characteristics and Lightning–Induced Realignment of Atmospheric Ice Crystals," *Radio Science,* vol. 17, No. 5, pp. 1243–1250 (Sep.–Oct. 1982).

A. Hendry et al., "Radar Observations of the Alignment of Precipitation Particles by Electrostatic Fields in Thunderstorms," *Journal of Geophysical Research,* vol. 81, No. 30, pp. 5353–5357 (Oct. 20, 1976).

P. Krehbiel et al., "Lightning Precursor Signatures from Dual–Polarization Radar Measurements of Storms," *URSI Commission F Open Symposium, Ravenscar, UK* (Jun. 1992).

(List continued on next page.)

*Primary Examiner*—Ian J. Lobo
*Attorney, Agent, or Firm*—Deborah A. Peacock; Jeffrey D. Myers; Donovan D. Duggan

[57] ABSTRACT

The disclosure is directed to a method and apparatus for remotely sensing electrical activity and potential for lightning occurrence. The disclosure is particularly directed to the use of such an apparatus and method to detect the electrical alignment of particles in upper levels of electrified storms. Storms are illuminated by radar in one or more orthogonal polarizations and the co-polar and cross-polar returns are correlated coherently and incoherently. The correlation coefficient, or a function thereof, is examined to determine the degree of particle alignment, and therefore the degree of electrification and potential for lightning occurrence. The phase of the correlation computation, in coherent processing, also detects particle alignment, which can be incorporated in the predictive decision. Correlation and phase can be displayed, recorded or, utilized for a prediction or warning.

38 Claims, 4 Drawing Sheets

OTHER PUBLICATIONS

G.C. McCormick et al., "Radar Measurement of Precipitation-Related Depolarization in Thunderstorms," *IEEE Transactions on Geoscience Electronics*, vol. GE–17, No. 4, pp. 142–150 (Oct. 1979).

D.J. Mendez, "Optical Polarization Induced by Electric Fields of Thunderstroms," *Journal of Geophysical Research*, vol. 74, No. 28, pp. 7032–7037 (1969).

B. Vonnegut, "Orientation of Ice Crystals in the Electric Field of a Thunderstorm," *Weather*, vol. 20, pp. 310–312 (1965).

A.J. Weinheimer et al., "The Electric Field Alignment of Ice Particles in Thunderstorms," *Journal of Geophysical Research*, vol. 92, pp. 14833–14844 (1987).

REMOTE PREDICTION OF LIGHTNING HAZARDS

GOVERNMENT RIGHTS

This invention was made with U.S. Government support under Grant No. AFOSR-89-0450 awarded by the Air Force Office of Scientific Research. The Government has certain rights in this invention.

BACKGROUND OF THE INVENTION

1. Field of the Invention (Technical Field)

The invention relates to a method and apparatus for determining when a storm has the potential for producing lightning, and more particularly to a method and apparatus for processing dual-polarization radar signals reflected from storms to detect the presence of electrically aligned particles that precede the occurrence of lightning within or from a storm.

2. Background Art

Most known systems for identifying electrified storms do so by detecting the occurrence of lightning within or from the storm. In these systems, lightning events are detected by sensing the transient electric or magnetic field changes which lightning produces, or by sensing higher-frequency electromagnetic radiation from the lightning at radio or optical frequencies. Examples of such systems are described in Ryan et al. (Paul A. Ryan and Nicholas Spitzer, "Stormscope," U.S. Pat. No. 4,023,408, issued May 17, 1977), Ryan et al. (Paul A. Ryan, Kenneth A. Ostrander and David L. West, "Storm Mapping System," U.S. Pat. No. 4,395,906, issued Aug. 2, 1983), Coleman (Ernest W. Coleman, "Storm Warning Method and Apparatus", U.S. Pat. 4,672,305, issued Jun. 9, 1987), and Krider et al. (E. Philip Krider, Alburt E. Pifer, and Leon G. Byerley III, "Thunderstorm Sensor and Method of Identifying and Locating Thunderstorms," U.S. Pat. No. 4,806,851, issued Feb. 21, 1989). Lightning data can be combined with conventional radar measurements of storm locations to identify which of several storms is producing lightning (George F. Andrews, "Spherics-to-Radar Data Converter," U.S. Pat. No. 3,508,259, issued Apr. 21, 1970). While the occurrence of lightning within or from a storm is a good indicator that the storm will produce additional lightning, it does not predict when the storm will be ready to produce the next lightning event. In addition, such methods and systems are unable to indicate when lightning will begin or end in a storm.

Alternatively, electrified storms can be identified by measuring the strong electrostatic fields which they produce. Lundquist et al. (Stig Adolf Svante Lundquist and Victor Scuka, "Thunderstorm Warning System," U.S. Pat. No. 3,611,365, issued Oct. 5, 1971) describes a system in which the electrostatic field from the storm is measured at a ground location and is used to trigger a warning, either from the electric field measurement itself when the field intensity exceeds a predetermined level or in combination with indications of lightning obtained in the manner described in the previous paragraph.

Thunderstorms are known to produce lightning as a result of the accumulation or segregation of electric charges at locations primarily inside the storm or on the surfaces of the storm cloud. The charges increase the electrical stress (i.e. the electrostatic field) in and around the storm until some natural or artificial event causes a lightning discharge to be triggered. The event or events which trigger natural lightning are not well understood, but such events require the presence of an electrostatic field whose magnitude or strength exceeds some threshold value within a volume of space, usually inside the storm. Methods or systems which sense the presence of strong electrostatic fields can be used to anticipate the occurrence or possible occurrence of lightning. Such methods or systems could be used to give warning of the initial onset of lightning within or from a storm, or to ascertain when a storm is finished producing lightning, or to anticipate the occurrence of individual lightning discharges within or from the storm. In addition, the systems could be used to give warning of the danger of the artificial triggering of lightning by objects such as aircraft or rockets flying through or near regions of strong electrostatic field.

Systems which measure the electrostatic field at or near the ground surface can provide warning of the impending occurrence of lightning, particularly at the beginning of a storm, but only if the measurements are made below the storm or at close range from it. The electrostatic field strength at the ground is known to decrease with the third power of the distance from the storm charges, so that a doubling of the distance decreases the field strength by a factor of eight. Smaller amounts of local electrical charge, which provide no lightning threat but which are closer to the measurement location can produce comparable or larger field strengths than the storm charges, and make the detection of impending lightning increasingly difficult as the storm progresses, even beneath the storm. Such local charges are known to be produced by weak electrical discharges, or coronae, from objects on the ground, and are known to mask the build-up of the storm charges to the next lightning discharge. Other local charges are known to reside on precipitation particles which fall toward the ground during and after the storm. Charged precipitation continues to fall for a period of time after the storm has ceased to present a lightning threat, and produces some of the highest electric field strengths measured at the ground from a storm. This unnecessarily prolongs the period of perceived lightning threat as inferred from ground electric field measurements.

The disadvantages of ground electric field measurements can be overcome to a certain extent by placing the instruments used to measure the electric field strength on an airborne platform, such as an airplane, balloon, or rocket, and flying them through or positioning them within or near storms to be monitored. This approach has substantial logistical disadvantages associated with the difficulty and/or expense of making airborne measurements, such as knowing where to make the measurements and being able to be at the necessary locations, and being able to adequately monitor storms both in space and in time. In addition, there are safety considerations associated with the bulky instrumentation and dangerous conditions in around storms. Finally, there are difficulties in interpreting observations that are not obtained directly from the strong-field region of a storm, and in separating out the temporal and spatial variability of measurements made from a moving platform.

An alternative approach to sensing electrified conditions in storms was suggested by B. Vonnegut in "Orientation of Ice Crystals in the Electric Field of a Thunderstorm", Weather, Vol. 20, pp. 310–312, (1965) who noted that ice crystals in storms should align themselves with the direction of the local electric field, and proposed that this effect should be detectable by viewing the upper parts of a storm cloud through polaroid filters. D. J. Mendez in "Optical Polarization Induced by Electric Fields of Thunderstorms," Journal of Geophysical Research, Vol. 74, No. 28, pp. 7032–7037 (1969) reported evidence that partly supported the detection of such an effect.

Hendry and McCormick (A. Hendry and G. C. McCormick, "Radar. Observations of the Alignment of Precipitation Particles by Electrostatic Fields in Thunderstorms," Journal of Geophysical Research, Volume 81, pp. 5353–5357, 1976) of the National Research Council in Canada reported radar observations which indicated that particles were being electrically aligned in the upper levels of electrified storms. The observations were made using a dual-channel circular polarization radar which operated at a frequency of 16.5 GHz, and were obtained by coherently correlating the co-polar (e.g. right-hand circular) and cross-polar (left-hand circular) returns from a storm. Large correlation coefficients, indicative of a high degree of common particle orientation or alignment, were observed in the upper parts of storms. The correlation values decreased suddenly at the time of lightning discharges, indicating that the particle alignment was caused by the electrostatic field of the storm. The altitude and nature of the correlated radar signals led them to conclude that the aligned particles were ice crystals, which depolarized the radar signal as it passed through regions of aligned particles, thereby giving rise to a correlated cross-polar return. This interpretation was confirmed and refined in two later papers (McCormick, G. C., and A. Hendry, "Radar Measurement of Precipitation-Related Depolarization in Thunderstorms", IEEE Transactions of Geoscience Electronics, Vol. GE-17, No. 4, Oct. 1976).

Hendry and McCormick noted that their observations had implications on the operation of earth-satellite communications links, and their results gave rise to a number of studies of such communications links by other investigators (e.g., Arnold and Cox, D. C., and H. W. Arnold, "Observations of Rapid Changes in the Orientation and Degree of Alignment of Ice Particles Along an Earth-Space Radio Propagation Path", Journal of Geophysical Research, Vol. 84(C8), pp. 5003–5010, (1979)). They did not discuss the possibility of using the technique for anticipating the occurrence of lightning or for identifying electrified storms, nor did they address this question in their investigations. One reason for this was that their radar system had only a limited capability for processing and displaying the observations in real time. Rather, their analyses were conducted primarily after the fact using a computer to analyze recorded signals.

Weinheimer and Few (A. J. Weinheimer and A. A. Few, "The Electric Field Alignment of Ice Particles in Thunderstorms," Journal of Geophysical Research, Volume 92, pp. 14833–14844, (1987)) concluded from a theoretical study that electric fields should have the ability to align ice crystals, indicating that ice crystals would be aligned in strong electric fields.

SUMMARY OF THE INVENTION

The present invention relates to a method and apparatus for real-time detection of the presence of electrically aligned particles in storms. The detection of particle alignment precedes the occurrence of an electrical event. This remote sensing system can predict the potential of a lightning occurrence within or from a storm.

The apparatus of the invention comprises a remote sensing system for electrical event prediction comprising an apparatus for transmitting polarized radiation in a confined beam structure. The apparatus further comprises structure for receiving co-polar and cross-polar return signals from the transmitting apparatus. The invention further comprises an apparatus for correlating the co-polar and cross-polar return signals to detect a level of particle alignment and structure for processing data from the correlating apparatus in order to estimate a likelihood of an electrical event. The preferred polarized radiation is circularly polarized, however, the polarized radiation can also be elliptically polarized or linearly polarized. The structure for transmitting polarized radiation can comprise transmitting a preselected sequence of orthogonal polarizations.

The confined beam structure preferably comprises alternate pulse radar transmissions. The preferred receiving apparatus comprises simultaneously receiving co-polar and cross-polar return signals both coherently and incoherently. The correlation structure can comprise coherent correlation and can also comprise incoherent correlation. The preferred correlation structure comprises a structure for determining a function of a correlation coefficient indicative of a predetermined degree of particle orientation. The preferred correlation apparatus also comprises a structure for determining a correlation phase indicative of a direction of common particle orientation. The preferred processing apparatus comprises structure for computing a correlation coefficient and a correlation phase. The preferred processing apparatus also comprises structure for displaying a function of correlation magnitude and phase. The preferred correlating structure comprises structure for digitizing the return signals and apparatus for digitally correlating the returns. The correlating structure can also comprise analog structure for processing the receiver returns and structure for digitally correlating the returns.

The preferred structure for processing comprises structure for displaying and can also comprise a structure for archiving. The preferred archiving apparatus comprises high density recording structure.

The method of the invention predicts and characterizes the build and discharge cycle of an electrical field and comprises the steps of: transmitting polarized radiation in a confined beam; receiving a scattered return signal from the transmitted signal; correlating the co-polar and cross-polar components of said return signal; processing a correlation coefficient as a function of spatial coordinates; and determining the likelihood of a an electrical event. The preferred step of transmitting polarized radiation in a confined beam comprises transmitting circularly polarized radiation. The step of transmitting polarized radiation can comprise transmitting linearly polarized radiation and can also comprise transmitting elliptically polarized radiation. The step of transmitting polarized radiation can also comprise transmitting a preselected sequence of orthogonal polarizations.

The preferred step of receiving comprises simultaneously receiving co-polar and cross-polar return signals both coherently and incoherently. The step of receiving can comprise correlating coherent return signals. The receiving step can also comprise correlating incoherent return signals. The step of correlating also comprises determining a function of a correlation coefficient indicative of a predetermined degree of common particle orientation. The step of correlating can also comprise determining a correlation phase indicative of a direction of common particle orientation.

The preferred step of processing comprises the steps of simultaneously inputting the co-polar and cross-polar return signals; computing a correlation coefficient; and computing a correlation phase. The preferred step of processing also comprises displaying a function of correlation magnitude and phase.

The preferred step of correlating comprises the steps of digitizing the receiver co-polar and cross-polar components and digitally correlating the co-polar and cross-polar components. The step of correlating can also comprise the steps of processing by analog circuit the co-polar and cross-polar components and digitally correlating co-polar and cross-polar components. The preferred step of processing comprises displaying the correlation coefficient and correlation phase as functions of spatial coordinance. The preferred step of processing also comprises archiving the correlation coefficient and correlation phase as functions of spatial co-ordinance.

One object of the present invention is to anticipate the first discharge within or from storm.

Another object of the present invention is to anticipate when a storm is ready to produce it next lightning discharge.

Yet another object of the present invention is to determine when the possibility of lightning still exists at the end of a storm.

Yet another object of this invention is to determine a storm is finished producing lightning.

Another object of the invention is to determine when lightning might be triggered in a storm by artificial means.

Still another object of the present invention is the determination when storms should be avoided to avoid artificial triggering of lightning.

One advantage of the present invention, is that radar signals are processed in real time so that regions of aligned particles and strong electrification are identified in a timely manner.

Another advantage of the present invention is the real time display to aid in identification of regions of aligned particles and strong electrification.

Yet another advantage of the present invention is the use of digital computation of the correlation and coefficient rather than hardware analog computation.

Yet another advantage of the present invention is the use of pulse to pulse alternation of transmitted polarization to aid in determining the nature and direction of alignment.

Yet another advantage of the present invention is the use of radar scanning to aid and monitor storm development and structure.

Yet still another advantage of the invention is the ability to monitor many storms using automated scan procedures.

Still another advantage of the invention is the use of a remote sensing technique to obtain an in-situ measurement.

BRIEF DESCRIPTION OF THE DRAWINGS

The accompanying drawings, which are incorporated into and form a part of the application, illustrate several embodiments of the present invention and, together with the description, serve to explain the principles of the invention. The drawings are only for the purpose of illustrating a preferred embodiment of the invention and are not to be construed as limiting the invention.

DETAILED DESCRIPTION OF THE PREFERRED EMBODIMENTS

BEST MODES FOR CARRYING OUT THE INVENTION

The method and apparatus for remote prediction for lighting hazards of the present invention comprise hardware and process for determining when a storm has the potential for producing an electrical event. The invention detects a level of particle alignment which are precursors for lightning events. The invention is useful for warning of local and extended areas of potential lightning hazard to land, sea and airborne activities. It also can be used to determine storm severity from the degree of electrification. Additionally, this invention can be used for remote advance warning of the severity of thunderstorms.

Figure 1:
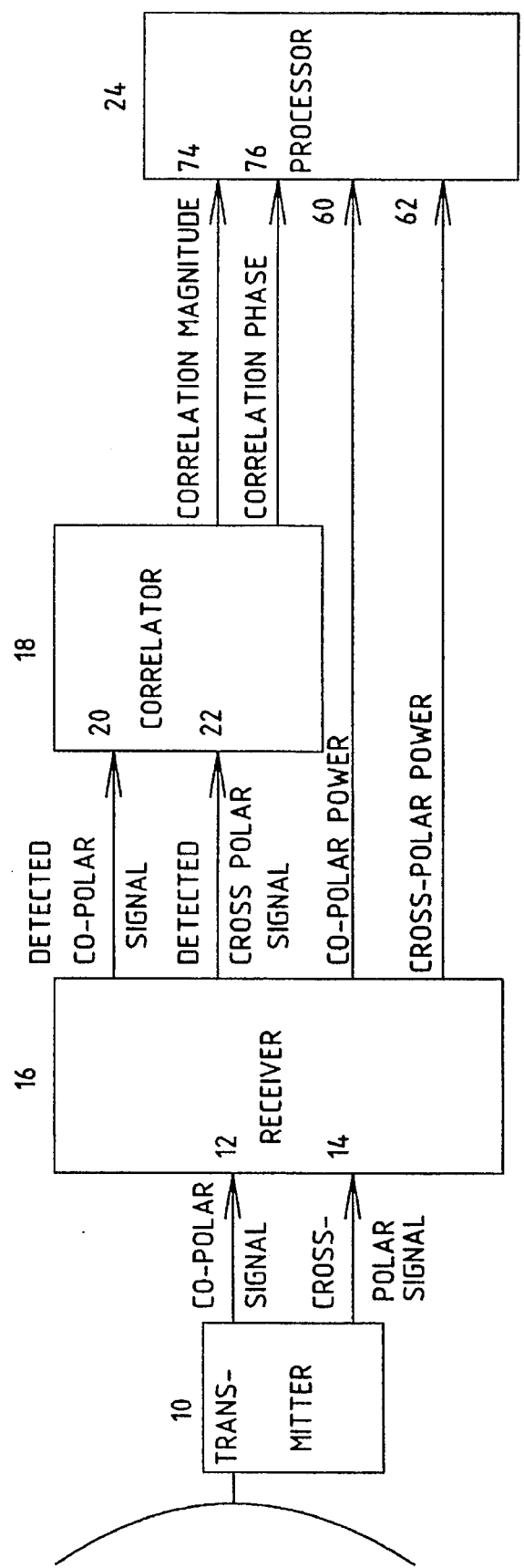
FIG. 1 is a block diagram of the preferred radar system illustrating the basic components of the invention.

FIG. 1 illustrates the general principles of the present invention. Radar 10 is used to observe electrified storms or potential electrified storms in the vicinity of radar 10 or in a region where it is of interest to determine the potential for lightning activity. Radar 10 can be ground-based, airborne, satellite-based or the like.

Radar 10 transmits signals of a given polarization and has a means for simultaneously receiving reflected signals in the same polarization as the transmitted signal and in the orthogonal polarization. Depending on the type of polarization, one of the reflected polarization signals is designated as co-polar signal 12. The reflected signal in the other polarization is usually weaker and is designated as cross-polar signal 14. Co-polar 12 and cross-polar 14 signals are input to receiver 16 and then to correlator 18 for determining the correlation between them. Optionally or alternatively, receiver 16 determines co-polar signal power 60 and cross-polar signal power 62. The correlation and power signals, or related signals, are input to processor 24 which further processes the signals and generates output signals for display 26 and/or to other devices The presence of strong electrostatic fields conducive to the production of lightning will be indicated when the magnitude of the co-polar and cross-polar correlation exceeds a pre-determined value at altitudes above the level where the temperature is zero degrees Centigrade or colder. Alternatively or additionally, strong electrostatic fields are indicated when the phase of the correlation is within a pre-determined range of values, and/or when the cross-polar power or the ratio of the cross-polar power to the co-polar power exceeds pre-determined values or has a local maximum above the zero degree Centigrade level.

Figure 2:
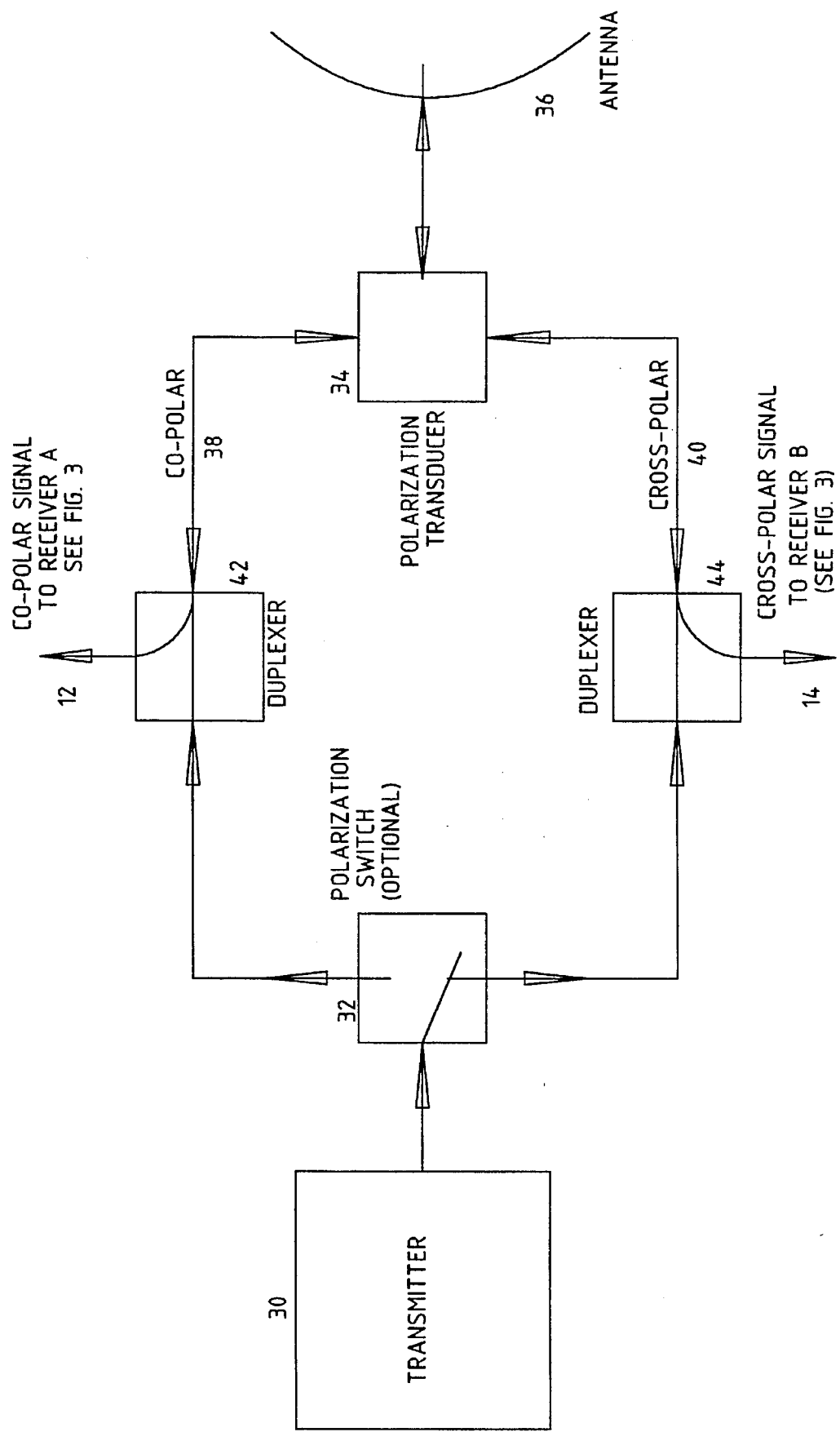
FIG. 2 is a block diagram of a radar transmitter/receiver illustrating the preferred polarization-determining components.

FIG. 2 illustrates a preferred method for transmitting and receiving the radar signals. Transmitter 30 is connected to antenna 36 through optional polarization switch 32 and polarization transducer 34. Polarization transducer 34 causes signals of a given polarization (e.g., right-hand circular polarization) to be radiated by radar antenna 36, and separates the reflected radar signals into two channels, 38 and 40, corresponding to orthogonal polarization components of the reflected signal (e.g. right-hand circular and left-hand circular polarization). Circular polarization is preferred because indications of electric field strength obtained using it are independent of the field orientation. Other polarizations may be used, however, including linear polarization, either aligned with the vertical and horizontal or at some angle with respect to vertical and horizontal, or elliptical polarization. In the case of circular polarization and with optional polarization switch 32 upper channel 38 corresponds to the co-polar reflected signal and lower channel 40 corresponds to the cross-polar reflected signal. Co-polar 12 and cross-polar 14 signals are channelled to receivers by means of duplexer elements 42 and 44. Optional polarization switch 32 enables the polarization of the transmitted signal to be changed in a pre-determined manner between the two polarizations provided by transducer 34, which can aid in determining the field orientation. Antenna 36, polarization transducer 34, and polarization switch 32 are preferred to have good isolation properties between the orthogonal polarizations to minimize cross-talk between the channels and false signals. In alternative embodiments, one or both of the reflected polarization signals could be received using a separate antenna or antennas. This could eliminate the need for polarization transducer 34.

Figure 3:
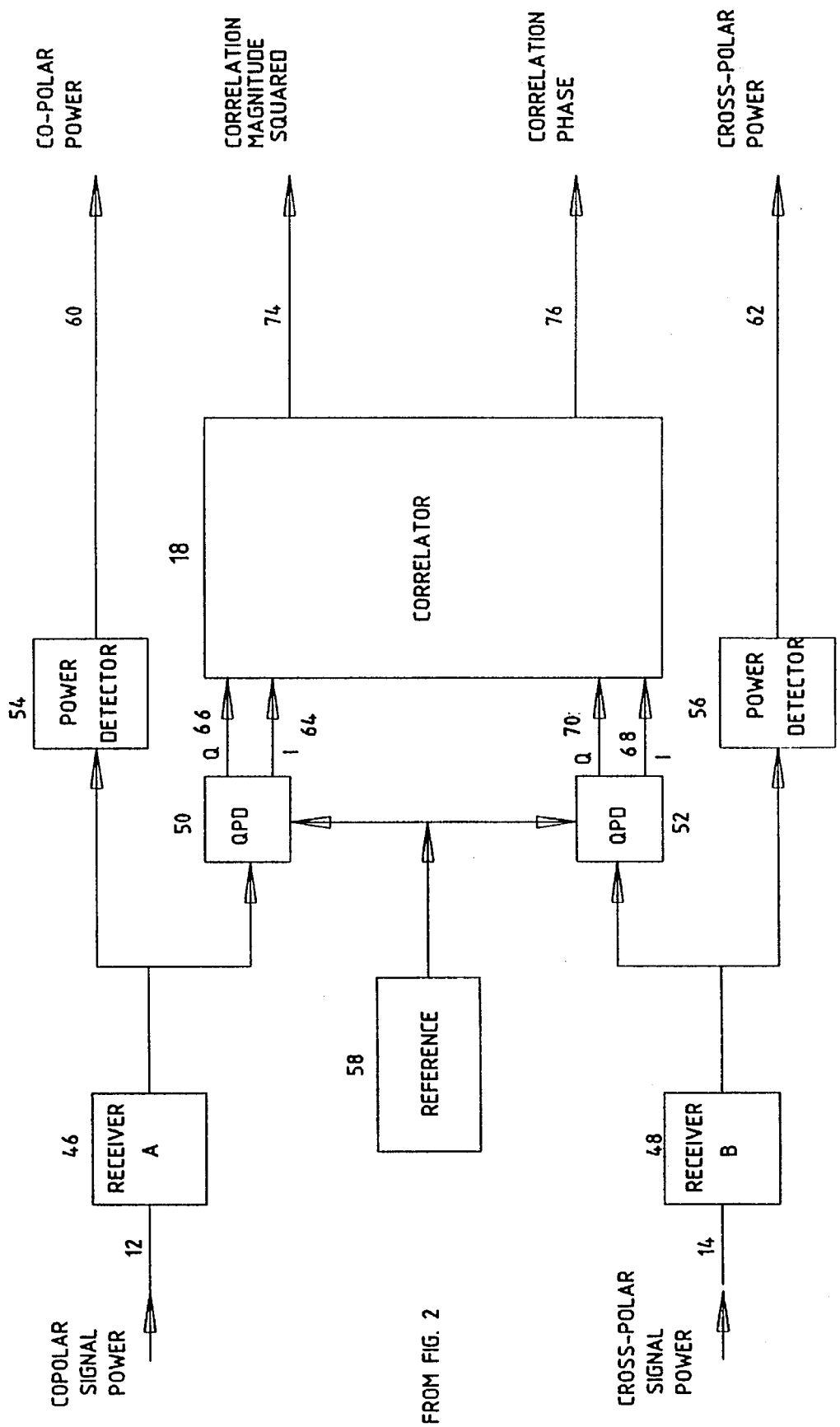
FIG. 3 is a block diagram of a radar receiver illustrating the preferred correlation and power processing components.

FIG. 3 illustrates a preferred method for receiving co-polar 12 and cross-polar 14 signals. Two receivers 46 and 48 amplify the signals in each of the channels and convert them to an intermediate frequency. The output of each receiver is connected to phase detectors 50 or 52 and to optional power detectors 54 or 56. Phase detectors 50 and 52 determine the phase of each signal relative to reference signal 58. A preferred method for detecting the phase is to use Quadrature Phase Detectors (QPD's), which generate in-phase (I) and quadrature (Q) output signals 64, 66, 68, and 70. Phase detectors 50 and 52 are preferably preceded by or incorporate and amplitude limiters to increase the range of signal amplitudes that can be processed. The outputs of phase detectors 50 and 52 are processed by correlator 18 to determine the extent and nature of any correlation between detected co-polar 20 and detected cross-polar 22 signals. Preferred quantities to be determined by the correlator are the squared magnitude (rho-squared) 74 and phase (phi) 76 of the mathematical correlation function between the two quantities. The preferred correlator is a digital system. The correlation can be performed in other ways (e.g. analog correlation circuits) and provide outputs which may be functions of the preferred quantities. Optional power detectors 54 and 56 produce outputs 60 and 62 which indicate the strength of the co-polar and cross-polar reflected signals.

Figure 4:
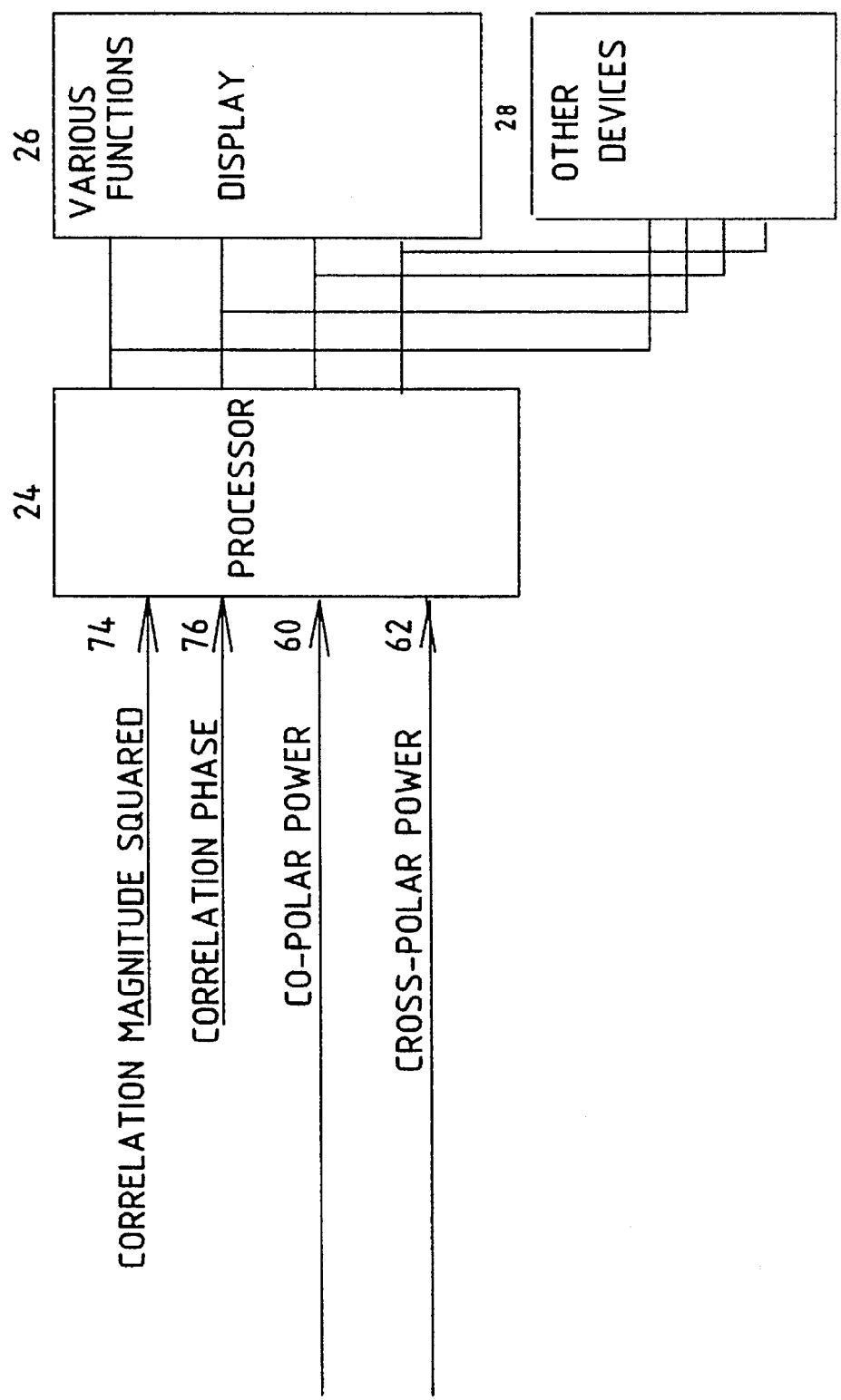
FIG. 4 is a block diagram continuation of FIG. 1 illustrating the preferred post-processing components.

FIG. 4 illustrates the basic system for further processing the radar observations. Correlation and power signals 74, 76, 60, and 62 are input to processor system 24, converted into a format more easily readable, and presented on display 26. Alternatively or additionally, processor 24 may send results to another output device 28, such as another computer, for further analysis. This could be, but is not limited to, an automatic lightning hazard alert system.

The correlation and power signals 74, 76, 60 and 62, or various products of the signals, can then be displayed on display system 26, either as a function of time while the antenna beam is pointed in a fixed direction through a storm, or as a function of antenna position as the radar beam is scanned through a storm or region of storms. A convenient way of indicating signal intensity on the display is to represent the range of signal intensities with a range of colors. The beam can be scanned in a single plane to generate cross-sections of the storm structure or in different directions to generate a series of cross-sections from which the spatial structure in three spatial dimensions can be ascertained. The presence of aligned particles is indicated by regions where the magnitude of the co-polar-cross-polar correlation exceeds a predetermined value, or where products of the correlation and power signals fall in a pre-determined range of values. The presence of strong electrostatic fields will be indicated when the region of aligned particles is above the altitude of the zero degree isotherm in the atmosphere or storm. This can be determined visually by a trained observer looking at the displayed signals or computationally by further processing of the correlation and/or power signals. The correlation phase can be used to ascertain the alignment direction if desired.

In an alternative embodiment, fixed pointing of an antenna beam improves the time resolution in anticipating the next lightning discharge. In another alternative embodiment, linear polarization can be used in stead of circular polarization. Additionally, elliptical polarization can also be utilized. Additionally, linear polarizations not aligned with horizontal and vertical directions can also be used. For example, linear polarization oriented 45 degrees with respect to the horizontal and vertical. Finally, the transmission of polarized radiation can also be transmitted in a preselected sequence of orthogonal polarizations.

What is claimed is:

1. A remote sensing-system for electrical event prediction comprising:

means for transmitting polarized radiation in confined beam means;

means for receiving co-polar and cross-polar return signals from said transmitting means;

means for correlating said co-polar and cross-polar return signals to detect a level of particle alignment and to provide data thereof; and means for processing said data from said correlating means in order to estimate a likelihood of an electrical event.

2. The system of claim 1 wherein said polarized radiation is circularly polarized.

3. The system of claim 1 wherein said polarized radiation is elliptically polarized.

4. The system of claim 1 wherein said polarized radiation is linearly polarized.

5. The system of claim 1 wherein said means for transmitting polarized radiation comprises transmitting a preselected sequence of orthogonal polarizations.

6. The system of claim 1 wherein said confined beam means comprises alternate pulse radar transmissions.

7. The system of claim 1 wherein said receiving means comprises simultaneously receiving co-polar and cross-polar return signals both coherently and incoherently.

8. The system of claim 1 wherein said correlation means comprises coherent correlation means.

9. The system of claim 1 wherein said correlation means comprises incoherent correlation means.

10. The system of claim 1 wherein said correlation means comprises means for determining a function of a correlation coefficient indicative of a predetermined degree of common particle orientation.

11. The system of claim 1 wherein said correlation means comprises means for determining a correlation phase indicative of a direction of common particle orientation.

12. The system of claim 1 wherein said processing means comprises computing a correlation coefficient and a correlation phase.

13. The system of claim 1 wherein said processing means comprises means for displaying a function of correlation magnitude and phase.

14. The system of claim 1 wherein said correlation means comprises means for digitizing said return signals and means for digitally correlating said return signals.

15. The system of claim 1 wherein said correlation means comprises analog means for processing said receiver return signals and means for digitally correlating said returns.

16. The invention of claim 1 wherein said processing means comprises means for displaying.

17. The system of claim 1 wherein said processing means comprises means for archiving.

18. The system of claim 17 wherein said archiving means comprises high-density recording means.

19. A method of characterizing the buildup and discharge cycle of electric fields and anticipating an electric event in the atmosphere comprising the steps of:

a) transmitting a polarized radiation signal into the atmosphere in a confined beam;

b) receiving a scattered return signal comprising co-polar and cross-polar components from the transmitted signal due to particles in the atmosphere;

c) processing both the co-polar and cross-polar return signals in real time to obtain a correlation magnitude and phase of the return signals and the powers of the return signals; and d) using correlation magnitude and phase power or functions of the correlation magnitude and phase and powers of the return signals in order to determine a likelihood of the electric event.

20. The method of claim 19 wherein the step of transmitting a polarized radiation signal in a confined beam comprises the step of transmitting a circularly polarized radiation signal.

21. The method of claim 19 wherein the step of transmitting a polarized radiation signal comprises the step of transmitting linearly polarized radiation signal.

22. The method of claim 19 wherein the step of transmitting a polarized radiation signal comprises the step of transmitting an elliptically polarized radiation signal.

23. The method of claim 19 wherein the step of transmitting a polarized radiation signal comprises the step of transmitting a preselected sequence of orthogonal polarizations signals.

24. The invention of claim 19 wherein the step of receiving comprises the step of simultaneously receiving co-polar and cross-polar return signals both coherently and incoherently.

25. The method of claim 19 wherein the step of correlating comprises the step of correlating coherent return signals.

26. The method of claim 19 wherein the step of correlating comprises the step of correlating incoherent return signals.

27. The method of claim 19 wherein the step of correlating comprises the step of determining a function of a correlation coefficient indicative of a predetermined degree of common particle orientation.

28. The method of claim 19 wherein the step of correlating comprises the step of determining a correlation phase indicative of a direction of common particle orientation.

29. The method of claim 19 wherein the steps of processing further comprise the steps of:

a) simultaneously inputting the co-polar and cross-polar components of said return signals;

b) computing a correlation coefficient; and c) computing a correlation phase.

30. The method of claim 19 wherein the steps of processing further comprise the step of displaying a function of correlation coefficient magnitude and correlation phase.

31. The method of claim 19 wherein the step of correlating further comprises the steps of:

a) digitizing the co-polar and cross-polar components; and b) digitally correlating the co-polar and cross-polar components.

32. The method of claim 19 wherein the step of correlating further comprises the steps of:

a) processing by analog circuit the co-polar and cross-polar components; and b) digitally correlating the co-polar and cross-polar components.

33. The method of claim 19 wherein the step of processing further comprises these displaying the correlation coefficient and correlation phase as functions of spatial coordinates.

34. The method of claim 19 wherein the step of processing further comprises the step of archiving the correlation coefficient and correlation phase as functions of spatial coordinates.

35. The system of claim 1 wherein the electrical event is lightning.

36. The system of claim 1 wherein the electrical event is a storm.

37. The method of claim 19 wherein the electrical event is lightning.

38. The method of claim 19 wherein the electrical event is a storm.

* * * * *